US010565210B2

(12) United States Patent
Krishnamoorthy et al.

(10) Patent No.: US 10,565,210 B2
(45) Date of Patent: Feb. 18, 2020

(54) GENERATING AND VERIFYING A REPUTATIONAL PROFILE

(71) Applicant: Verizon Patent and Licensing Inc., Arlington, VA (US)

(72) Inventors: Manian Krishnamoorthy, Hyannis, MA (US); Ying Chen, Newark, DE (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 416 days.

(21) Appl. No.: 14/948,869

(22) Filed: Nov. 23, 2015

(65) Prior Publication Data

US 2017/0147155 A1   May 25, 2017

(51) Int. Cl.
*G06F 16/2457* (2019.01)
*G06F 16/248* (2019.01)
*G06F 16/335* (2019.01)
*G06Q 50/00* (2012.01)
*G06Q 10/10* (2012.01)

(52) U.S. Cl.
CPC ........ *G06F 16/2457* (2019.01); *G06F 16/248* (2019.01); *G06F 16/337* (2019.01); *G06Q 10/10* (2013.01); *G06Q 50/00* (2013.01); *G06Q 50/01* (2013.01)

(58) Field of Classification Search
CPC ............. G06F 3/0481; G06F 17/30522; G06F 17/30554; G06F 17/30702
See application file for complete search history.

(56) References Cited

U.S. PATENT DOCUMENTS

| | | | | |
|---|---|---|---|---|
| 8,220,035 | B1* | 7/2012 | Pravetz | H04L 63/1483 715/749 |
| 9,275,420 | B1* | 3/2016 | Fredinburg | G06Q 50/01 |
| 9,396,376 | B1* | 7/2016 | Narayanaswami | G06K 19/06056 |
| 9,646,101 | B1* | 5/2017 | Wu | G06F 17/30879 |
| 9,781,132 | B2* | 10/2017 | Ramakrishnan | H04L 63/123 |
| 9,847,989 | B2* | 12/2017 | Hakimian | H04L 63/08 |
| 2004/0111467 | A1* | 6/2004 | Willis | G06F 17/30702 709/203 |
| 2006/0042483 | A1* | 3/2006 | Work | G06Q 10/00 101/91 |
| 2008/0046968 | A1* | 2/2008 | Cline | G06F 21/31 726/2 |
| 2009/0284344 | A1* | 11/2009 | Craymer | G06Q 20/341 340/5.54 |
| 2010/0177891 | A1* | 7/2010 | Keidar | H04N 5/913 380/200 |
| 2011/0051173 | A1* | 3/2011 | Yagishita | G06F 3/1222 358/1.14 |

(Continued)

*Primary Examiner* — Renee D Chavez
*Assistant Examiner* — Jeremy L Stanley

(57) ABSTRACT

A device may receive user information associated with a user and may generate a reputational profile based on the user information. The device may receive a request to provide a graphical representation associated with the reputational profile to another device associated with a service. The device may generate a reputational indicator based a subset of information, in the reputational profile, that is related to the service. The device may provide the graphical representation, including the reputational indicator, to the other device associated with the service.

20 Claims, 6 Drawing Sheets

(56) References Cited

U.S. PATENT DOCUMENTS

| | | | |
|---|---|---|---|
| 2011/0277024 A1* | 11/2011 | Begley | H04L 63/08 726/7 |
| 2012/0066065 A1* | 3/2012 | Switzer | G06Q 20/10 705/14.53 |
| 2012/0124192 A1* | 5/2012 | Daoud | G06Q 30/02 709/224 |
| 2013/0089133 A1* | 4/2013 | Woo | G06T 1/0085 375/240.01 |
| 2013/0124644 A1* | 5/2013 | Hunt | H04L 51/12 709/206 |
| 2013/0187926 A1* | 7/2013 | Silverstein | G06Q 10/105 345/440 |
| 2013/0276075 A1* | 10/2013 | Gong | H04W 76/02 726/5 |
| 2013/0301830 A1* | 11/2013 | Bar-El | H04L 9/08 380/210 |
| 2013/0325704 A1* | 12/2013 | Gorman | G06Q 50/265 705/39 |
| 2014/0059124 A1* | 2/2014 | Song | H04L 67/22 709/204 |
| 2014/0236927 A1* | 8/2014 | Catledge | G06F 17/30522 707/722 |
| 2014/0259103 A1* | 9/2014 | Gunasekara | H04W 12/12 726/2 |
| 2014/0325678 A1* | 10/2014 | Kotla | G06F 21/62 726/28 |
| 2014/0365466 A1* | 12/2014 | Chu | G06F 17/30702 707/722 |
| 2015/0006672 A1* | 1/2015 | Morel | G06Q 30/0269 709/217 |
| 2015/0041530 A1* | 2/2015 | Burkhart | G06K 19/06037 235/375 |
| 2015/0101008 A1* | 4/2015 | Zent | H04L 63/20 726/1 |
| 2015/0163189 A1* | 6/2015 | Proctor | H04L 51/32 715/753 |
| 2015/0281774 A1* | 10/2015 | Atkin | H04N 21/64322 725/14 |
| 2015/0355815 A1* | 12/2015 | Palti-Wasserman | G06F 3/013 715/835 |
| 2016/0034461 A1* | 2/2016 | Sundaram | G06F 17/30522 707/728 |
| 2016/0104253 A1* | 4/2016 | Song | G06F 21/6236 705/15 |
| 2016/0125498 A1* | 5/2016 | Setty | G06Q 30/0627 705/26.63 |
| 2016/0148012 A1* | 5/2016 | Khitrov | G06F 21/32 726/19 |
| 2016/0217276 A1* | 7/2016 | Choi | G06F 21/10 |
| 2016/0241592 A1* | 8/2016 | Kurkure | H04L 63/1483 |
| 2016/0292238 A1* | 10/2016 | Qiao | G06Q 10/10 |
| 2016/0292643 A1* | 10/2016 | Rodriguez | G06F 16/9535 |
| 2016/0314329 A1* | 10/2016 | Papazian | G06K 7/1417 |
| 2017/0075536 A1* | 3/2017 | Cho | G06F 17/30867 |
| 2017/0091194 A1* | 3/2017 | Spiegel | G06F 17/3053 |
| 2017/0178204 A1* | 6/2017 | Ranger | G06Q 30/0282 |
| 2017/0193124 A1* | 7/2017 | Wong, Jr. | G06F 17/30879 |
| 2017/0357670 A1* | 12/2017 | Chrapko | G06F 17/30241 |
| 2017/0358043 A1* | 12/2017 | Joynt | G06Q 50/16 |
| 2017/0364535 A9* | 12/2017 | Lavine | G06F 17/30241 |
| 2018/0025334 A1* | 1/2018 | Pourfallah | G06Q 40/02 |
| 2018/0047071 A1* | 2/2018 | Hsu | G06Q 30/0282 |

\* cited by examiner

GENERATING AND VERIFYING A REPUTATIONAL PROFILE

BACKGROUND

A user may have one or more accounts associated with one or more services (e.g., a social media service, a professional networking service, etc.). Third parties (e.g., colleagues, customers, etc.) that interact with the user may provide reviews, endorsements, etc., regarding the user, which may be displayed in association with a corresponding account. Other users may analyze the reviews, comments, etc. when determining whether to transact with the user.

DETAILED DESCRIPTION OF PREFERRED EMBODIMENTS

The following detailed description of example implementations refers to the accompanying drawings. The same reference numbers in different drawings may identify the same or similar elements.

A user utilizing a service (e.g., a website, an application, or the like) that involves a transaction (e.g., a human interaction, a sharing of a resource, an exchange of resources, a sale, etc.) may want to know a level of trustworthiness and/or a reputation of another party to the transaction. For example, a first party to a transaction may want to know information regarding a second party to the transaction when determining whether to entrust the second party with the first party's property, valuables, or the like. Further, the second party may want to know information regarding the first party when determining whether to transact with the first party. Implementations described herein may assist a first user in conveying information concerning a reputation of the first user to a second user and/or discerning a reputation of the second user. Further, implementations described herein may reduce fraudulent representations, thereby enhancing network security. Additionally, implementations described herein may reduce the need for other users to conduct multiple searches for user reputation information, thereby conserving network, memory, and processor resources.

Figure 1A:
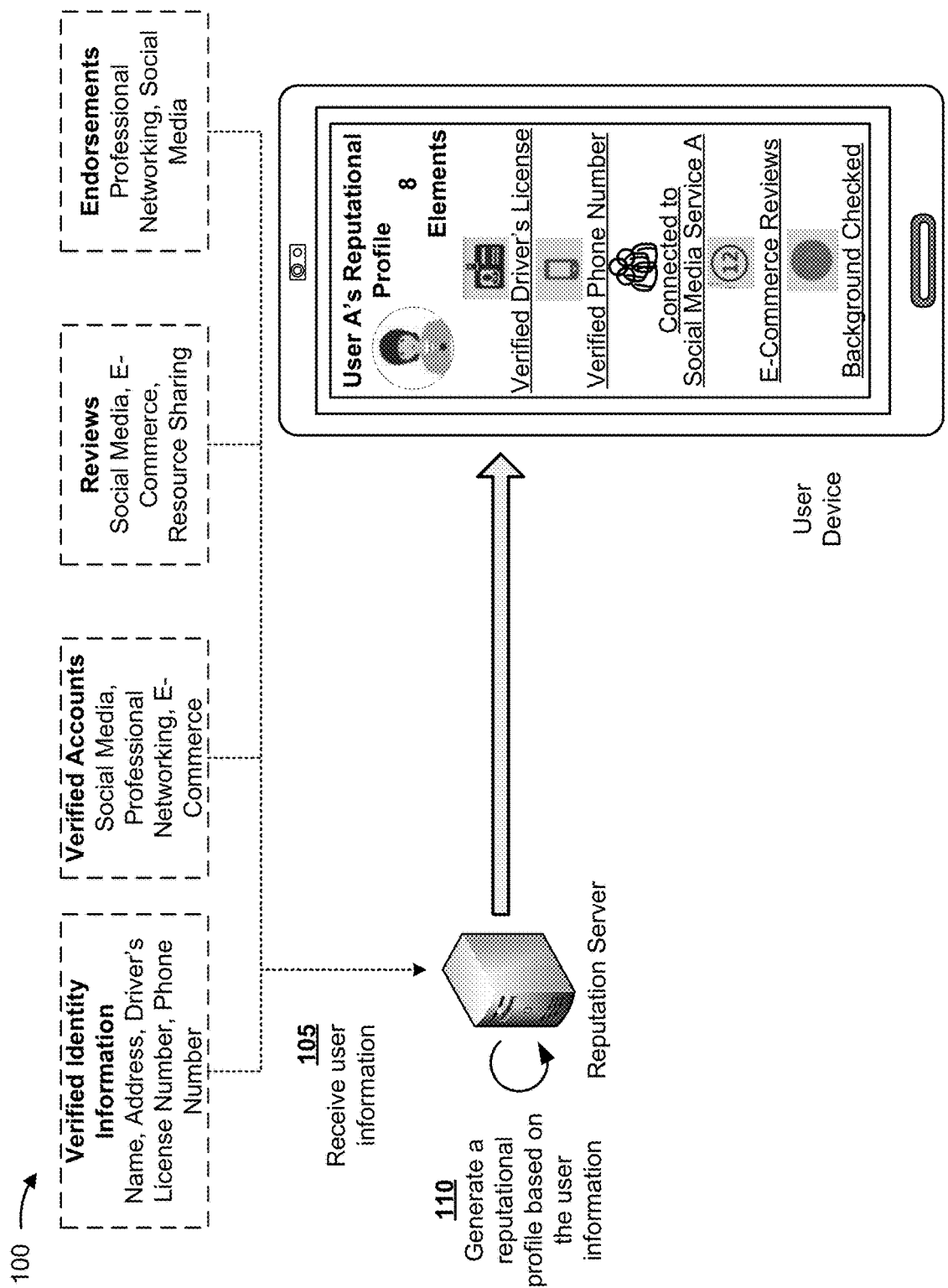
FIGS. 1A-1C are diagrams of an overview of an example implementation described herein.
Figure 1B:
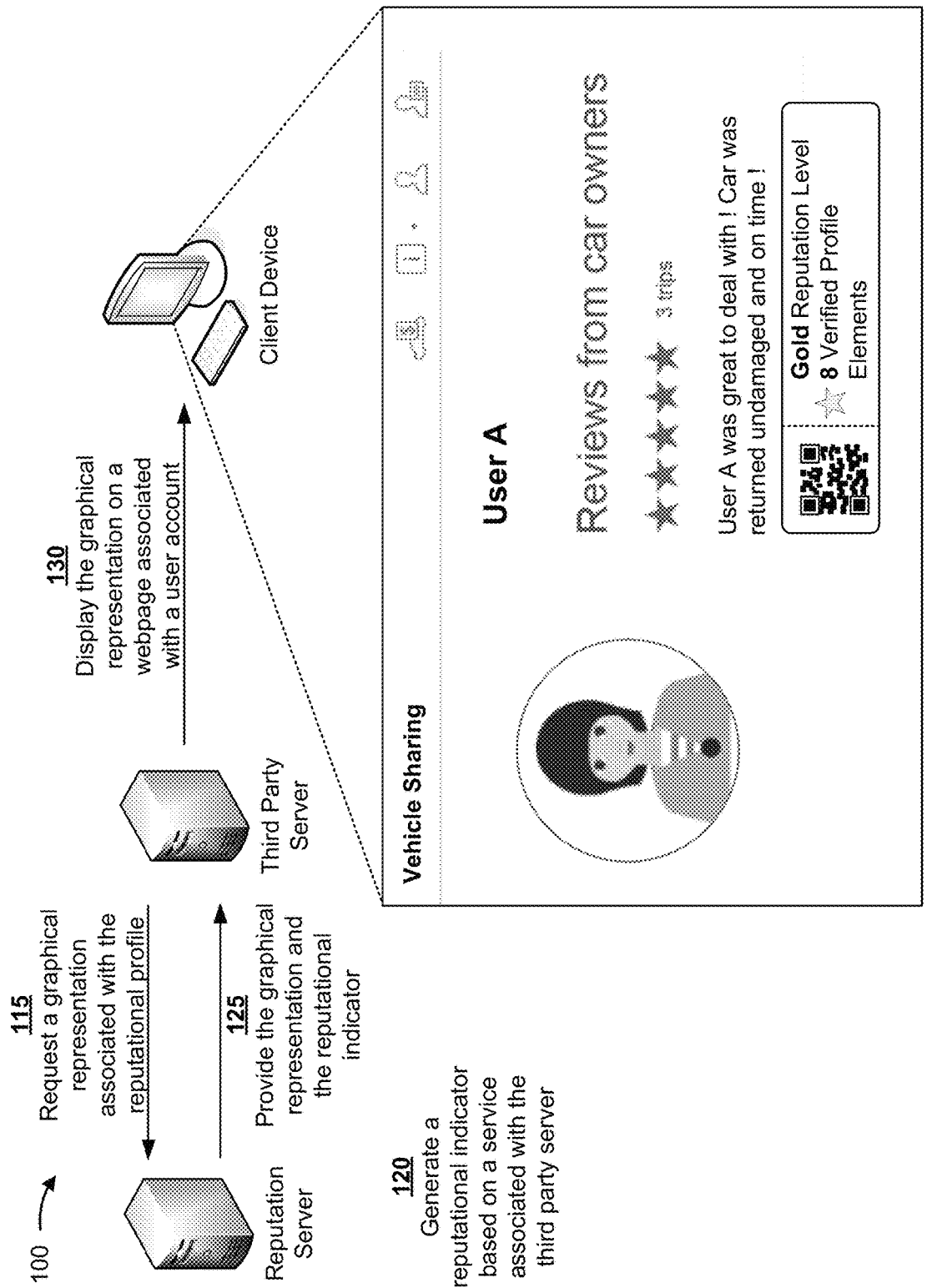
Figure 1C:
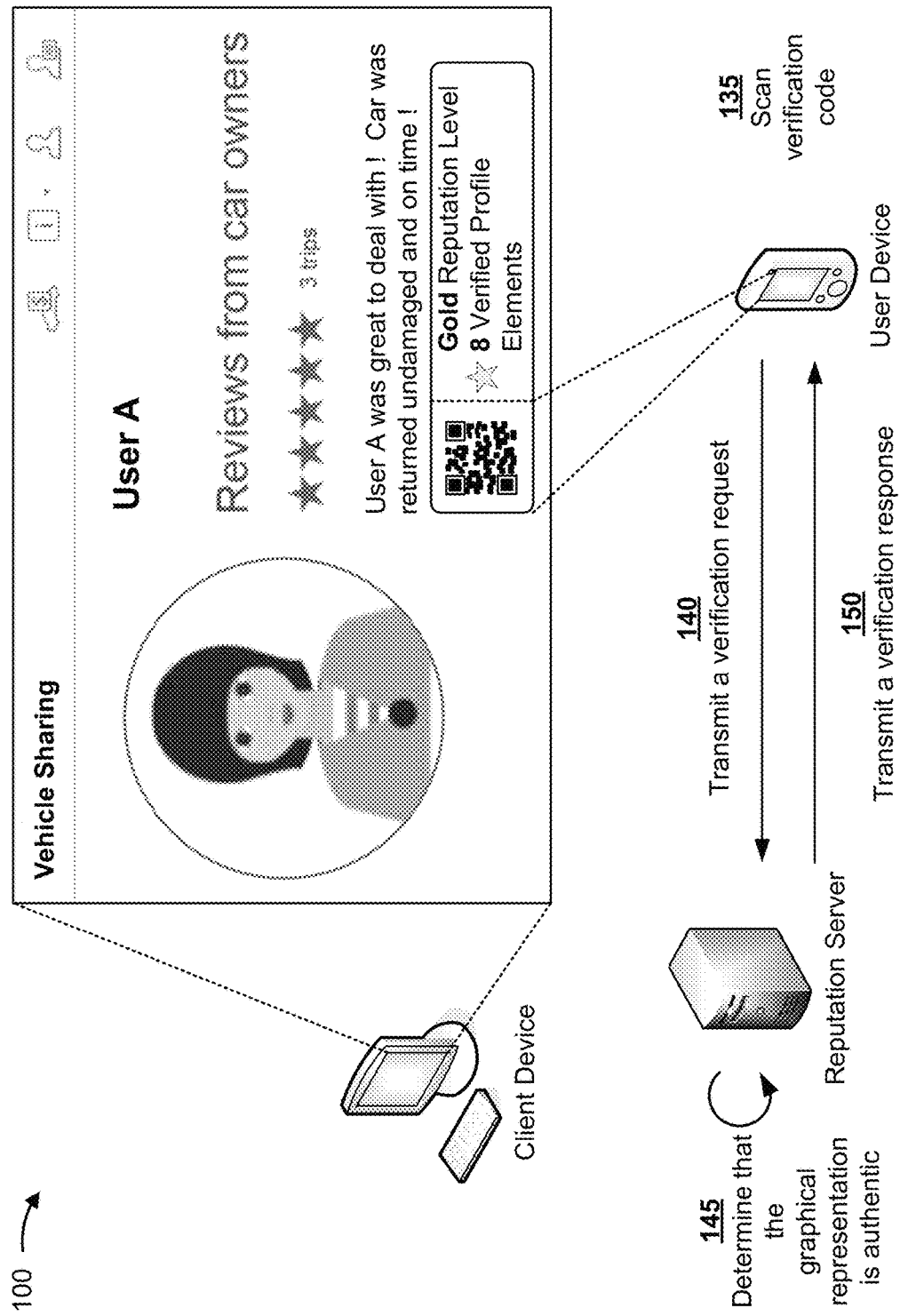

FIGS. 1A-1C are diagrams of an overview of an example implementation 100 described herein. As shown in FIG. 1A, and by reference number 105, a reputation server may receive user information, associated with a first user, from multiple sources. A user may include, for example, an individual, a group of individuals, a business, an organization, or the like. For example, as shown, the reputation server may receive and verify identity information, account information, reviews associated with user accounts, endorsements associated with user accounts, etc. As shown by reference number 110, the reputation server may generate a reputational profile based on the user information. For example, the reputational profile may include a user image and may include various profile elements determined based on the user information (e.g., a verified driver's license, a verified phone number, etc.).

As shown in FIG. 1B, and by reference number 115, a third party server may request that the reputation server provide a graphical representation associated with the reputational profile. The third party server may be associated with a service (e.g., a website, application, etc. for transactions, for social purposes, for business purposes, etc.). Further, a user (e.g., the first user) that has a reputational profile may have an account with the service, and may request to display the graphical representation on a webpage associated with the account, for example.

As shown by reference number 120, the reputation server may generate a reputational indicator based on the service associated with the third party server. The reputational indicator may include, for example, a score, a grade, a value, etc. based on the reputational profile. For example, as shown, assume that the service associated with the third party server is a vehicle sharing service. The reputation server may evaluate the reputational profile associated with the first user, and may generate a reputational indicator based on user information applicable to the service (e.g., the vehicle sharing service).

For example, assume that the reputational profile includes a quantity of positive reviews associated with another service (e.g., a property sharing service, a home rental service, etc.). The reputation server may evaluate the reputational profile and generate a reputational indicator for the vehicle sharing service based on the first user's positive reputation regarding a similar service. Further, the reputation server may generate the reputational indicator based on a quantity of profile elements included in the reputational profile when generating the reputational indicator.

As shown by reference number 125, the reputation server may provide the graphical representation to the third party server. In some implementations, the reputation server may embed a verification code (e.g., a quick response (QR) code) in the graphical representation, which may allow the graphical representation to be verified. As shown by reference number 130, the third party server may display the graphical representation on a webpage associated with a user account (e.g., an account associated with the first user). The graphical representation may include, for example, an image including a portion of the reputational profile (e.g., one or more profile elements, a reputational indicator, etc.) that may be displayed on a webpage. As shown, a client device may display a webpage associated with the user account including the graphical representation. In this way, a second user may discern a level of trustworthiness of the first user based on the graphical representation.

As shown in FIG. 1C, and by reference number 135, a second user may use a user device to scan the verification code (e.g., the QR code) embedded in the graphical representation to verify the graphical representation (e.g., to verify that the graphical representation is authentic). As shown by reference number 140, the user device may transmit a verification request including the QR code to the reputation server. As shown by reference number 145, the reputation server may receive the QR code and may use the QR code to determine whether the graphical representation is authentic. As shown by reference number 150, the reputation server may transmit a verification response to the user device associated with the second user based on determining that the graphical reputation is authentic. In this way, the graphical representation and/or the reputational profile associated with the first user may be verified to prevent fraudulent graphical representations or reputational profiles from being used, thereby increasing transactional security.

Implementations described herein may allow a user to convey reputational information to other users. For example, implementations described herein may allow a reputation server to aggregate user information from multiple sources, and generate a reputational profile based on the user information. Further, implementations described herein may allow a reputation server to generate a reputational indicator, which may convey the reputation of a user. Other devices may receive the reputational indicator, and may display a graphical representation including the reputational indicator in association with corresponding user accounts. Additionally, implementations described herein may verify a reputational profile, a graphical representation, and/or a reputational indicator. In this way, other users may view the graphical representation and/or reputational indicator when determining whether to transact with the user. Further, other users may discern reputational information associated with the user based on viewing the graphical representation, as compared to conducting multiple searches (e.g., regarding user information), thereby conserving network, memory, and processor resources. Further, implementations described herein may verify that a graphical representation is authentic, thereby reducing fraudulent transactions, improving network security, and conserving network resources.

As indicated above, FIGS. 1A-1C are provided merely as examples. Other examples are possible and may differ from what was described with regard to FIGS. 1A-1C.

Figure 2:
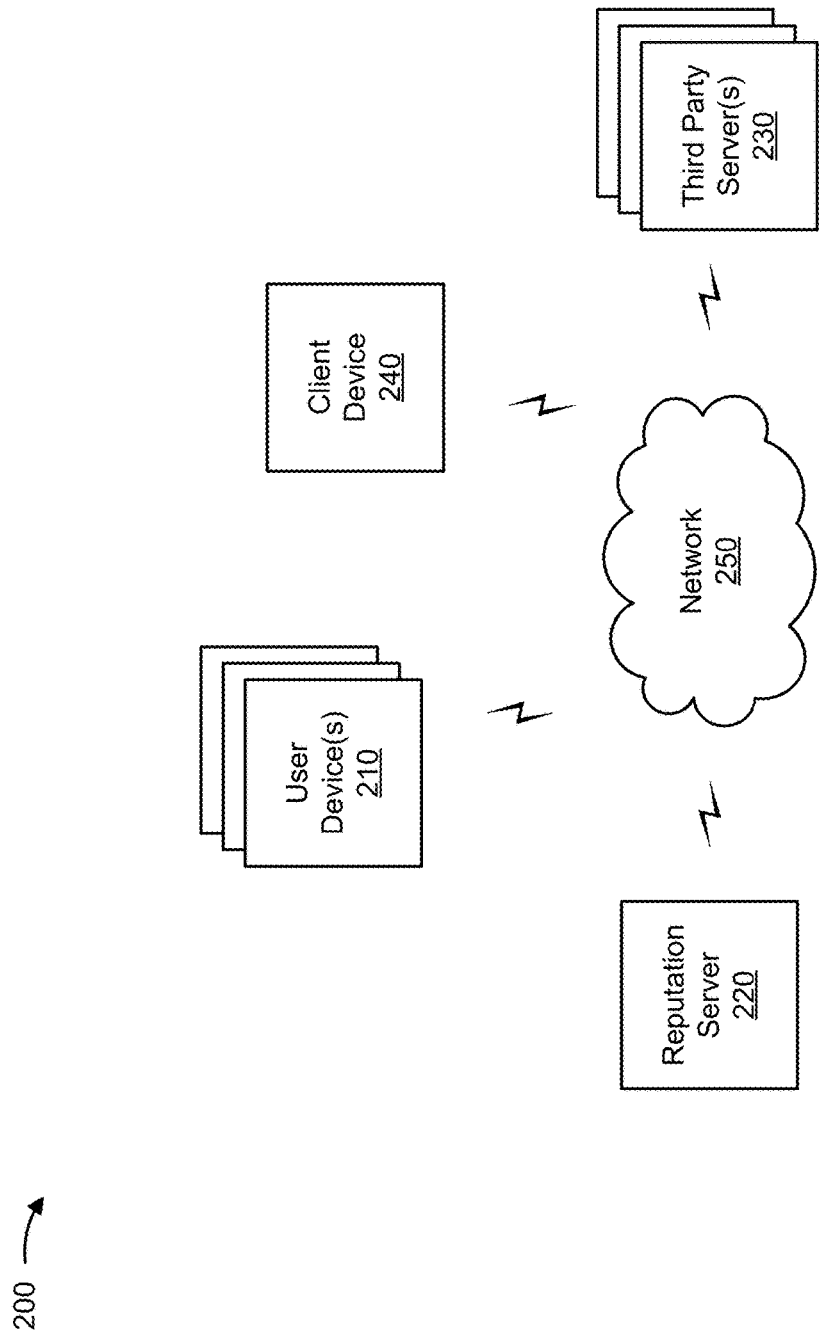
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210 (hereinafter referred to collectively as "user devices 210," and individually as "user device 210"), a reputation server 220, one or more third party servers 230 (hereinafter referred to collectively as "third party servers 230," and individually as "third party server 230"), a client device 240, and a network 250. Devices of environment 200 may interconnect via wired connections, wireless connections, or a combination of wired and wireless connections.

User device 210 may include one or more devices capable of receiving, generating, storing, processing, and/or providing information associated with a reputational profile. For example, user device 210 may include a mobile phone (e.g., a smart phone, a radiotelephone, etc.), a tablet computer, a handheld computer, a laptop computer, a desktop computer, a wearable communication device (e.g., a smart wristwatch, a pair of smart eyeglasses, etc.), or a similar device. In some implementations, user device 210 may provide information to reputation server 220 to generate a reputational profile and/or to request that a graphical representation, associated with the reputational profile, be generated and/or provided to third party server 230.

Reputation server 220 may include one or more devices capable of receiving, generating, storing, processing, and/or providing information associated with a reputational profile. For example, reputation server 220 may include a computing device, such as a server, a network device, or a similar device. Reputation server 220 may receive user information associated with a user, and may generate a reputational profile based on the user information. In some implementations, reputation server 220 may generate a reputational indicator based on the user information, and may provide the reputational indicator to one or more third party servers 230. In some implementations, reputation server 220 is operated by a party that is independent from parties operating third party servers 230 and users of user devices 210.

In some implementations, reputation server 220 may provide a graphical representation, associated with a reputational profile, to third party server 230. For example, reputation server 220 may receive a request (e.g., from user device 210, third party server 230, etc.) to provide a graphical representation associated with a reputational profile, and may generate and/or provide the graphical representation based on the request. Additionally, or alternatively, reputation server 220 may receive a verification request to verify a graphical representation, may determine whether the graphical representation is authentic, and may provide a verification response based on determining whether the graphical representation is authentic.

Third party server 230 may include one or more devices capable of receiving, generating, storing, processing, and/or providing information associated with a service. For example, third party server 230 may include a computing device, such as a server (e.g., a content server, a web server, a host server, a database server, etc.), or the like. Third party server 230 may provide access to a service and may store information for a user account associated with a user. In some implementations, third party server 230 may receive a reputational profile and/or a graphical representation from reputation server 220, and may provide information associated with the reputational profile and/or the graphical representation in association with a user account. For example, third party server 230 may provide a webpage associated with a user account to another device (e.g., user device 210, client device 240, etc.).

Client device 240 may include a device capable of receiving, generating, storing, processing, and/or providing information associated with accessing a service. For example, client device 240 may include a computing device, such as a desktop computer, a laptop computer, a tablet computer, a handheld computer, a phone (e.g., a mobile phone, a smart phone, a radiotelephone, a wireline phone, etc.), a wearable communication device (e.g., a smart wristwatch, a pair of smart eyeglasses, etc.), or a similar device. A second user may use client device 240 to access a service and/or view a user account associated with a first user (e.g., via a webpage provided by third party server 230).

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
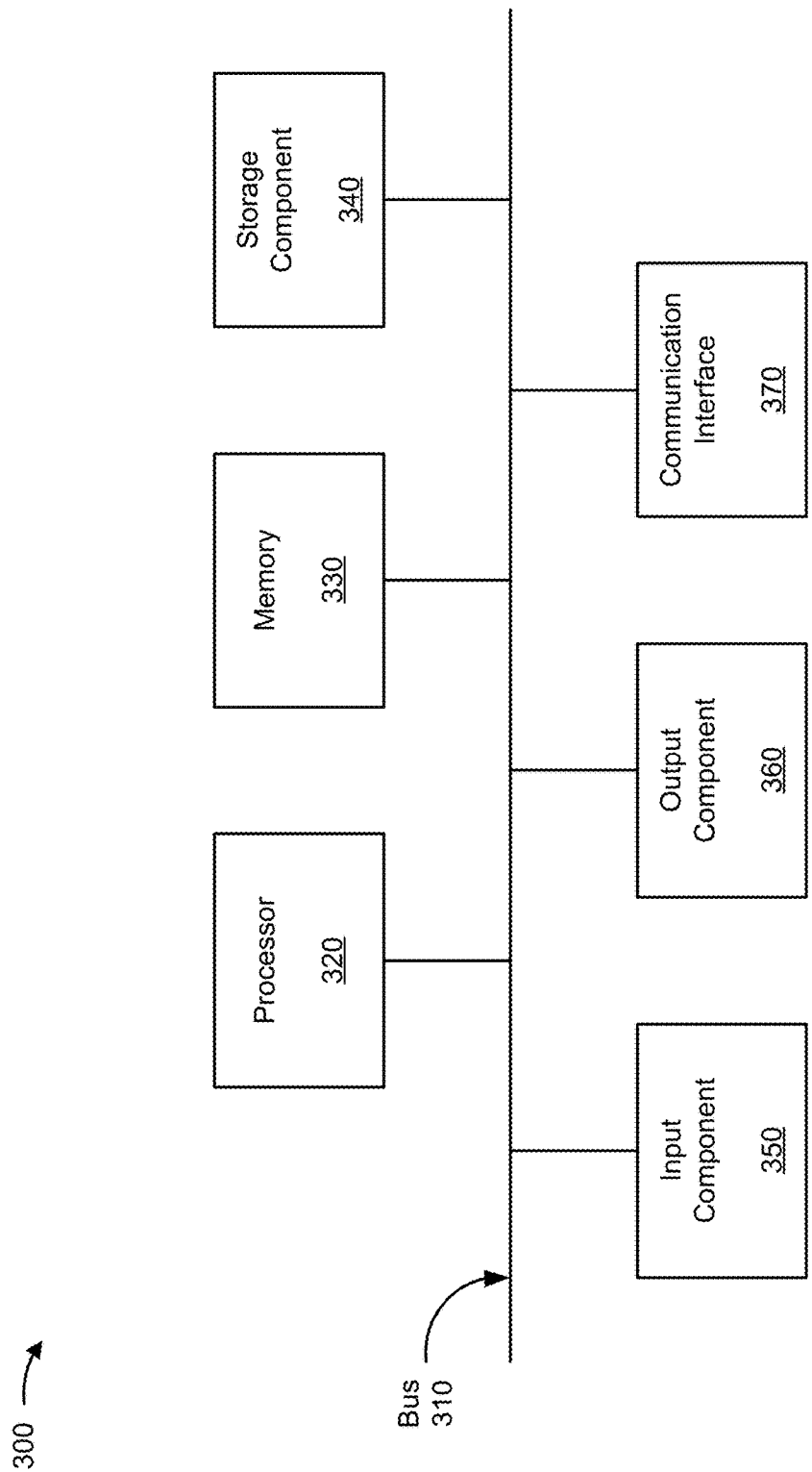
FIG. 3 is a diagram of example components of one or more devices of FIG. 2.

FIG. 3 is a diagram of example components of a device 300. Device 300 may correspond to user device 210, reputation server 220, third party server 230, and/or client device 240. In some implementations, user device 210, reputation server 220, third party server 230, and/or client device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
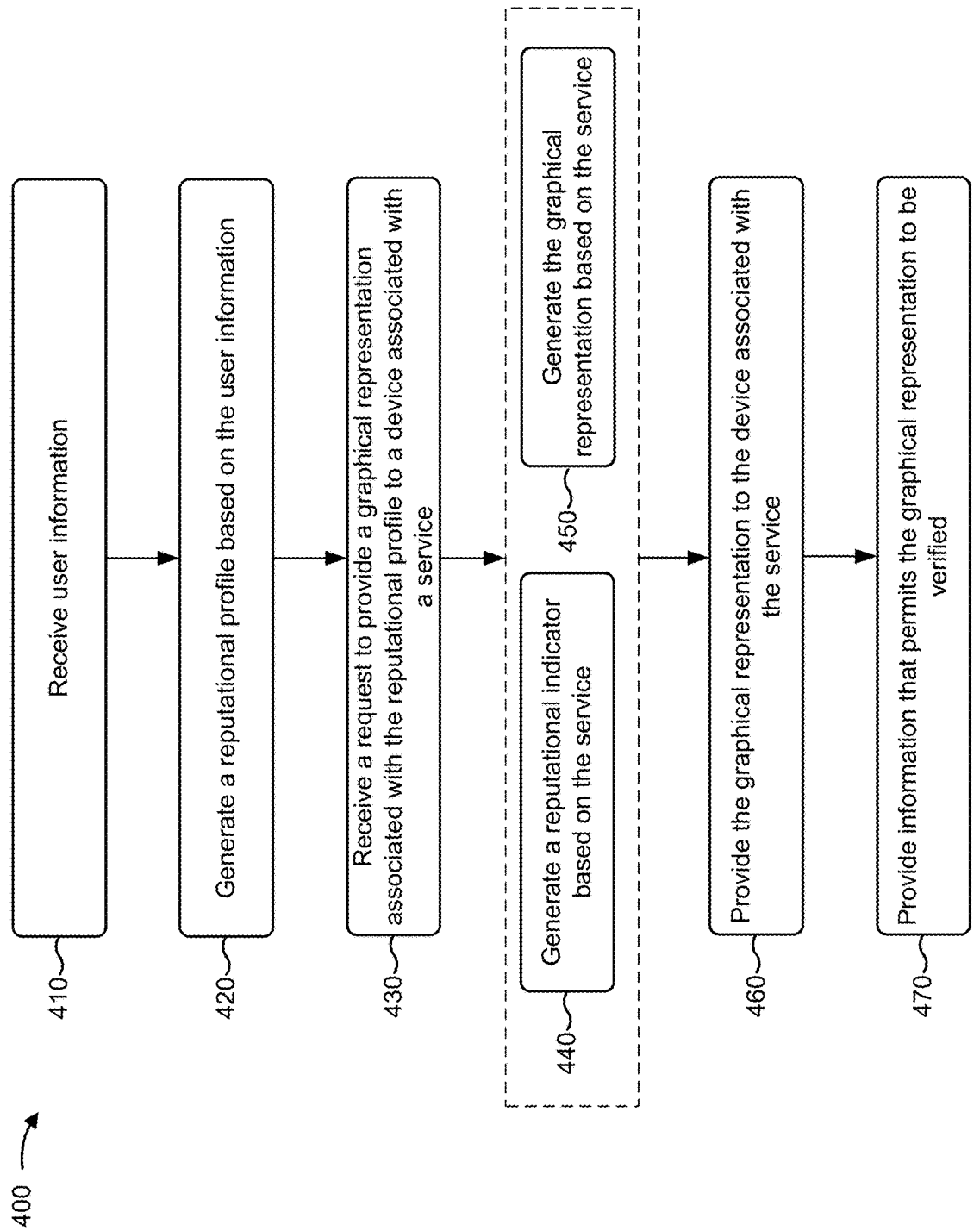
FIG. 4 is a flow chart of an example process for generating and verifying a reputational profile.

FIG. 4 is a flow chart of an example process 400 for generating and verifying a reputational profile. In some implementations, one or more process blocks of FIG. 4 may be performed by reputation server 220. In some implementations, one or more process blocks of FIG. 4 may be performed by another device or a group of devices separate from or including reputation server 220, such as user device 210, third party server 230, and/or client device 240.

As shown in FIG. 4, process 400 may include receiving user information (block 410). For example, reputation server 220 may receive user information. In some implementations, reputation server 220 may receive user information based on a user downloading and installing a reputational profile application, on user device 210, that is associated with reputation server 220. A user may include an individual, a group of individuals, an organization, a business, an institution, or the like. User information may include information associated with an identity of the user, such as, a user name, a user image, a user identifier (e.g., a social security number, a passport number, a driver's license number, a registration number, etc.), a user birth date, a user phone number, a user address, a user email address, an internet protocol (IP) address associated with user device 210, or the like.

In some implementations, user information may include information provided by a third party (e.g., an organization, an institution, or the like). For example, the user information may include a criminal record, a commercial record, a financial record, an employment record, an educational record, a professional record, a background check, or the like. In some implementations, user information may refer to information associated with user financial information, such as information identifying a financial account, information identifying a credit card associated with the user, information associated with a credit score or credit record, or the like. In some implementations, a user may request that a third party provide the user information to reputation server 220 (e.g., via a device). Additionally, or alternatively, reputation server 220 may request that the third party provide the information (e.g., based on a user input). A third party may provide the information to reputation server 220 (e.g., based on a user request, based on a request from reputation server 220, or the like).

In some implementations, user information may include information associated with one or more user accounts, such as a user account associated with a service (e.g., a social media account, a social networking account, a professional networking account, an e-commerce account, an e-commerce marketplace account, a retail account, a crowdfunding account, a dating account, a media sharing account, a resource sharing account, a weblog account, a ride sharing account, a property rental account, a job recruiting account, etc.). For example, the user information may include a level of usage by the user of the user account, a metric associated with the user account (e.g., a quantity of contacts, friends, colleagues, etc. associated with the user account), or the like.

In some implementations, the user information may include reputation information provided by other users (e.g., contacts of the user, customers of the user, colleagues of the user, etc.) in association with one or more user accounts associated with one or more third party servers 230 (e.g., reviews, ratings, posts, endorsements, acknowledgements, feedback, opinions, etc.). For example, other users may provide reputation information by reviewing the user, rating the user, commenting on the user, evaluating the user, etc. For example, other users may transact with the user and may provide reputation information associated with the user by interacting with a user account (e.g., providing a review, a comment, a rating, or the like). For example, assume that another user transacts with the user and has a positive experience. The other user may interact with a user account (e.g., provide a positive review), and third party server 230 associated with the user account may store the reputation information (e.g., the positive review).

In some implementations, user information may include information that has been verified (e.g., a phone number, an email address, an account, or the like). For example, reputation server 220 may send a message including a response code to a phone number, an email address, a user account, or the like, and may receive a message including the response code in return. In this way, reputation server 220 may verify information associated with the user, an account associated with the user, etc.

In some implementations, reputation server 220 may receive the user information based on a user input (e.g., via user device 210). Additionally, or alternatively, reputation server 220 may receive the user information based on accessing one or more user accounts (e.g., a social media account, an e-commerce account, etc.). For example, a user may allow reputation server 220 to access one or more user accounts (e.g., may provide credentials to connect reputation server 220 to the one or more user accounts). Further, reputation server 220 may access the one or more user accounts and may extract user information (e.g., using an application programming interface (API)). Additionally, or alternatively, reputation server 220 may receive the user information from a third party (e.g., an organization, an institution, etc.). In this way, reputation server 220 may receive user information from multiple sources and may generate a reputational profile based on the user information, as described below.

As further shown in FIG. 4, process 400 may include generating a reputational profile based on the user information (block 420). For example, reputation server 220 may generate a reputational profile based on the user information. A reputational profile may include stored information associated with the user (e.g., the user information). In some implementations, reputation server 220 may use particular user information when generating the reputational profile. Additionally, or alternatively, a user may elect to provide particular information to reputation server 220 and/or withhold particular information from reputation server 220. Similarly, reputation server 220 may permit the user to gain access to the user's information and select to keep or discard some or all of the information.

In some implementations, the reputational profile may include one or more versions. For example, the reputational profile may include a complete version (e.g., including all of the user information) or a limited version (e.g., including some of the user information). For example, the complete version may include a full name of the user, an actual image of the user, and one or more profile elements. Additionally, or alternatively, limited versions of the profile may include an alias (e.g., a first name of the user, a nickname of the user, a username, or the like), a modified image associated with the user (e.g., a distorted image of the user, a non-actual image of the user, an avatar, or the like), and one or more profile elements.

A profile element may correspond to the user information and/or may include a representation of the user information, in some implementations. For example, a profile element corresponding to a user phone number may include the actual phone number (e.g., "(111) 234-5678") and/or may include a representation of the phone number (e.g., "Verified phone number"). Further, a profile element may correspond to a portion of user information that may be provided in a reputational profile. If reputation server 220 receives more user information, then the reputational profile may include more profile elements (e.g., a verified phone number, a verified name, a background check, a connected account, etc.). In some implementations, the reputational profile may include one or more profile elements that represent user information, but do not include the user information. For example, a profile element representing a driver's license number may include "verified driver's license," but may not actually include the actual driver's license number. In this way, a user may limit the quantity of information provided to other users, thereby increasing user privacy and/or security of the user's information.

In some implementations, a profile element may include an image, a hyperlink, and/or the like, that is included in the reputational profile. For example, if the user information includes account information associated with the user (e.g., an account associated with social media service A), then a corresponding profile element may include an image indicating "connected to social media service A." Additionally, or alternatively, a profile element may include a hyperlink that may provide access to the user information (e.g., may link to an account associated with the user).

In some implementations, a user may provide input to request that a service be provided with access to the reputational profile, as described in more detail below. For example, a user may provide input to allow reputation server 220 to provide third party server 230 with access to the reputational profile. A user may input a preference indicating a quantity of information associated with the reputational profile that third party server 230 may access. For example, a user may provide full access (e.g., the complete version), partial access (e.g., the limited version), and/or may deny access to the reputational profile. Further, in some implementations, a user may configure which profile elements may be accessed by third party server 230. In this way, a user may configure access to the reputational profile, and reputation server 220 may determine an amount of user information to provide to a service associated with third party server 230 based on the configuration.

As further shown in FIG. 4, process 400 may include receiving a request to provide a graphical representation, associated with the reputational profile, to a device associated with a service (block 430). For example, reputation server 220 may receive a request to provide a graphical representation associated with the reputational profile to third party server 230 that is associated with a service. In some implementations, the graphical representation may represent one or more portions of the reputational profile. For example, a graphical representation may include a user image, an indication of a quantity of profile elements associated with the reputational profile, a reputational indicator, or the like. A reputational indicator may include a score, a value, a grade, or the like, that may be indicative of a reputation of a user, as described in more detail below.

For example, the user associated with the reputational profile may have a user account with the service associated with third party server 230, and may elect to display the graphical representation on a webpage or application associated with the user account. Additionally, or alternatively, the user associated with the reputational profile may elect to display the graphical representation on a webpage or application associated with the service (e.g., in association with a user post displayed on a webpage, an offer of a resource for sale displayed on a webpage, an offer of a resource for rent displayed on a webpage, or the like). In some implementations, the user may request reputation server 220 to provide the graphical representation associated with the reputational profile to third party server 230 associated with the service. For example, the user may request reputation server 220 to provide the graphical representation to third party server 230 by providing input to user device 210 (e.g., using the reputational profile application). Additionally, or alternatively, third party server 230 may request that reputation server 220 provide the graphical representation based on a user request. In some implementations, reputation server 220 may receive the request, and may transmit an authentication request to user device 210. Based on receiving a response to the authentication request from user device 210, reputation server 220 may provide the graphical representation to third party server 230, as described in more detail below.

As further shown in FIG. 4, process 400 may include generating a reputational indicator based on the service (block 440). For example, reputation server 220 may generate a reputational indicator based on the service provided by third party server 230. In some implementations, a reputational indicator may include a score, a value, a grade, a rating, or the like, that may be indicative of a reputation of a user. In some implementations, reputation server 220 may determine a category (or categories) of service that may be relevant to one or more particular profile elements. For example, reputation server 220 may determine that a profile element (e.g., a verified resource sharing account) is relevant to one or more categories of services (e.g., e-commerce, property sharing, rental, etc.). Reputation server 220 may store information identifying profile elements and corresponding categories of services that may be relevant to the profile elements (e.g., in a data structure, such as a lookup table).

In some implementations, reputation server 220 may generate the reputational indicator based on the service. For example, reputation server 220 may determine a category for the service, and may identify one or more profile elements that are relevant to the determined category (e.g., via the data structure). For example, reputation server 220 may determine that particular profile elements included in the reputational profile are more applicable to the service than other profile elements, and may use the particular profile elements when generating the reputational indicator. For example, assume that the service is a first resource sharing service (e.g., a vehicle sharing service). Reputation server 220 may determine that a particular profile element (e.g., a quantity of positive reviews) associated with a second resource sharing service (e.g., a property sharing service) is relevant to the first resource sharing service. In this case, reputation server 220 may use the profile element associated with the second resource sharing service when generating the reputational indicator for the first resource sharing service. Additionally, or alternatively, reputation server 220 may assign more weight to the particular profile element (e.g., the quantity of positive reviews) than to another profile element (e.g., endorsements associated with a professional networking service). In this way, the reputational indicator may more accurately reflect the reputation of the user in connection with a particular service.

In some implementations, reputation server 220 may generate the reputational indicator based on a quantity of profile elements included in the reputational profile. For example, reputation server 220 may generate a higher reputational indicator (e.g., score) for a reputational profile that includes more profile elements (e.g., a verified phone number, a verified email address, a connected social media account, and a background check) than a reputational profile that includes fewer profile elements (e.g., a verified phone number and a connected social media account). Additionally, or alternatively, reputation server 220 may generate the reputational indicator based on a quantity of profile elements that are relevant to the service.

In some implementations, reputation server 220 may generate a reputational indicator based on the profile elements included in the reputational profile. For example, a reputational profile may include one or more profile elements associated with one or more accounts (e.g., an e-commerce account, a professional networking account, etc.), and may include user information provided by third parties (e.g., customers, colleagues, etc.) in association with the one or more accounts (e.g., reviews, feedback, endorsements, etc.).

Reputation server 220 may generate a reputational indicator based on the user information provided by third parties (e.g., a quantity of reviews, a quantity of positive reviews, a quantity of endorsements, a quantity of feedback, etc.). For example, reputation server 220 may generate a higher reputational indicator (e.g., score) for a reputational profile that includes more reviews and/or more positive reviews associated with more user accounts (e.g., an e-commerce account, a professional networking account, etc.) than for a reputational profile that includes fewer reviews and/or fewer positive reviews associated with fewer user accounts. In this way, reputation server 220 may aggregate user information and generate a reputational indicator based on the aggregated user information.

In some implementations, reputation server 220 may generate the reputational indicator based on one or more techniques (e.g., algorithms, machine learning, computational statistics, etc.). For example, reputation server 220 may implement a technique that generates the reputational indicator based on one or more profile elements. In some implementations, the technique may receive information identifying known profile elements, combinations of profile elements, etc. and known reputational indicators, and may correlate the known profile elements with the known reputational indicators (e.g., using machine learning, computational statistics, or the like).

In some implementations, reputation server 220 may implement a technique to generate the reputational indicator based on one or more profile elements and the service. For example, reputation server 220 may identify a category (or categories) associated with the service, and may generate the reputational indicator based on identifying one or more relevant profile elements. Reputation server 220 may generate a first reputational indicator for the user in association with a first service (e.g., a property sharing service), and may generate a second reputational indicator for the user in association with a second service (e.g., a dating service), for example. In this way, the first reputational indicator and the second reputational indicator may be different (e.g., because a reputational indicator may be determined based on the service, and one or more profile elements may be more or less applicable to different services).

In some implementations, reputation server 220 may provide the reputational indicator to third party server 230, which may assist the user in conveying reputational information to other users, as described below.

As further shown in FIG. 4, process 400 may include generating the graphical representation based on the service (block 450). For example, reputation server 220 may generate the graphical representation based on the service provided by third party server 230. For example, reputation server 220 may generate a graphical representation including one or more profile elements based on the service. For example, reputation server 220 may identify a category (or categories) associated with the service, and may determine one or more profile elements that are relevant to the category (or categories) of the service. In this way, reputation server 220 may determine that particular profile elements are applicable to the service provided by third party server 230, and may include information associated with the particular profile elements for display with the graphical representation.

For example, assume that the service associated with third party server 230 is a ride sharing service. Reputation server 220 may determine that a profile element (e.g., an account with a property sharing service) is relevant to the service (e.g., the ride sharing service), and may generate a graphical representation that includes information indicating that the user has an account with the property sharing service, for example. Additionally, or alternatively, reputation server 220 may generate a graphical representation that includes an indication of a reputation of the user in association with another service (e.g., include a rating of the user in association with another service, a quantity of reviews, or the like). Additionally, or alternatively, reputation server 220 may generate a graphical representation that includes one or more links (e.g., a hyperlink) to one or more accounts associated with the user. In this way, reputation server 220 may generate a graphical representation that may display one or more profile elements associated with the reputational profile (e.g., the graphical representation may display "Verified Phone Number," "Verified Social Security Number," "Connected to Service A," etc.).

In this way, reputation server 220 may generate a graphical representation based on the service. For example, reputation server 220 may generate a first graphical representation based on a first service (e.g., a ride sharing service) that includes particular profile elements (e.g., a subset of the one or more profile elements) that are relevant to the first service (e.g., an account associated with a property sharing service, a quantity of reviews in association with a resource sharing service, or the like). Further, reputation server 220 may generate a second graphical representation based on a second service (e.g., a dating service) that includes particular profile elements that are relevant to the second service (e.g., a verified phone number, a verified user account, etc.). In this way, reputation server 220 may generate different graphical representations for the user based on one or more services.

As further shown in FIG. 4, process 400 may include providing the graphical representation to the device associated with the service (block 460). For example, reputation server 220 may provide the graphical representation to third party server 230 associated with the service. As described above, the graphical representation may include a user image, an indication of a quantity of profile elements associated with the reputational profile, a reputational indicator, an indication of a quantity of profile elements associated with the reputational profile, or the like. Additionally, or alternatively, the graphical representation may include one or more links associated with one or more profile elements (e.g., links to user accounts, links to user information, etc.).

Third party server 230 may receive the graphical representation from reputation server 220 and may display the graphical representation on a webpage or in a user interface of an application associated with a user account (e.g., a user account associated with the same user as the reputational profile). For example, the user may have an account associated with the service associated with third party server 230. Third party server 230 may display the graphical representation on the webpage associated with the user account, and may provide the webpage to other users. In some implementations, other users may view information from the user's account (e.g., using client device 240), and may view the graphical representation. In this way, the graphical representation may convey the user's reputation to other users.

In some implementations, reputation server 220 may provide third party server 230 with the reputational profile. For example, based on a user preference, reputation server 220 may provide third party server 230 with a complete version of the reputational profile or a limited version of the reputational profile. In some implementations, another user may interact with the graphical representation (e.g., click the graphical representation) and third party server 230 may provide the other user with information associated with the reputational profile. For example, third party server 230 may display a list of profile elements associated with the reputational profile (e.g., "verified phone number," "connected to service A," etc.). In this way, other users may discern more information regarding the user based on interacting with the graphical representation.

As further shown in FIG. 4, process 400 may include providing information that permits the graphical representation to be verified (block 470). For example, reputation server 220 may provide information to third party server 230, client device 240, and/or another user device 210 that permits the graphical representation to be verified. In some implementations, reputation server 220 may provide a dynamic visual element (e.g., a dynamically changing graphical representation) that permits the graphical representation to be verified. For example, reputation server 220 may provide a graphical representation that dynamically changes (e.g., by including visual elements that dynamically change, by including visual elements that shift, or the like). In this way, reputation server 220 may provide information that permits the graphical representation to be verified by making the graphical representation more difficult to replicate as compared to a static graphical representation.

In some implementations, reputation server 220 may provide a graphical representation that includes an embedded pattern that is displayed according to a user setting. The embedded pattern may permit the graphical representation to be verified. For example, another user (e.g., a user other than the user associated with the graphical representation) may download and install the reputational profile application (e.g., using another user device 210). Based on installing the reputational profile application, the other user may be assigned a particularized pattern to be displayed on the graphical representation, and on other graphical representations associated with other users, in some implementations. The other user may view the graphical representation (e.g., on a webpage associated with the user account), and may interact with the user graphical representation (e.g., by hovering a cursor over the graphical representation, by clicking the graphical representation, by pressing the graphical representation, by capturing an image of the graphical representation, etc.). Based on the other user interacting with the graphical representation, the graphical representation may display the assigned pattern. Reputation server 220 may provide information that permits the graphical representation to be verified based on providing the assigned pattern. In this way, other users of the reputational application may discern a counterfeit graphical representation based on the graphical representation not displaying the assigned pattern and/or displaying a pattern different than the assigned pattern.

In some implementations, reputation server 220 may embed a verification code in the graphical representation to permit the graphical representation to be verified. For example, the verification code may include a QR code, a bar code, a string of characters, or the like. Client device 240 may display the graphical representation (e.g., on a webpage associated with the user account), including the verification code, and another user may interact with the verification code. For example, another user, using another user device 210 may scan a verification code and transmit a verification request to reputation server 220. Reputation server 220 may receive the verification request from the other user device 210, may determine whether the graphical representation is authentic, and may provide a verification response to the other user device 210 based on determining that the graphical representation is authentic.

Additionally, or alternatively, another user, viewing the user account (e.g., the user account including the graphical representation) on another user device 210, may interact (e.g., tap, click, etc.) with the graphical representation to transmit a verification request to reputation server 220. In some implementations, reputation server 220 may provide the graphical representation and may change the verification code at a particular time interval. In this way, reputation server 220 may prevent counterfeit graphical representations by making the graphical representation more difficult to replicate. Further, reputation server 220 may provide information that permits the graphical representation to be verified based on embedding a verification code in the graphical representation, and providing a verification response of the graphical representation based on receiving a verification request from another device. In this way, reputation server 220 may provide information that indicates that the reputational profile and/or the graphical representation are authentic, which may assist other users in determining whether to interact with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a device to receive user information and generate a reputational profile based on the user information. Further, implementations described herein may enable a device to provide the reputational profile and/or a graphical representation associated with the reputational profile to another device. The other device may display the graphical representation in association with an account associated with the user. In this way, a device may aggregate user information from various sources, may generate a reputational profile and/or a graphical representation that may convey a reputation of the user, and may provide the profile and/or graphical representation to other devices. In some implementations, the profile and/or graphical representation may be provided to a third party (e.g., for display on a webpage), and the profile and/or graphical representation may be tailored to a service offered by a third party. In this way, other users may discern reputational information associated with a user based on viewing the reputational profile and/or the graphical representation. Further, other users may quickly discern reputational information by viewing the reputational profile and/or graphical representation, as opposed to conducting multiple searches for information regarding the user, thereby conserving network resources. Further, by verifying the reputational profile and/or graphical representation, implementations described herein may reduce fraudulent transactions, thereby conserving network resources. Further, by reducing fraudulent transactions, implementations described herein may improve network security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces (e.g., graphical representations, graphical indicators, etc.) have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory; and
one or more processors to:
access multiple types of user accounts of a first user;
receive, based on accessing the multiple types of user accounts of the first user, user information associated with the first user,
the user information including identity information associated with an identity of the first user and reputation information associated with a reputation of the first user;
generate a reputational profile for the first user based on the user information;
assign, based on an installation of a reputation application on a second device associated with a second user, a particularized embedded pattern to the second user to be displayed on graphical representations associated with reputational profiles of a plurality of users including the first user,
the particularized embedded pattern allowing the graphical representations to be verified;
receive, from a third device associated with a service and based on an interaction by the second user on the second device, a request to provide a graphical representation associated with the reputational profile for the first user;
generate a reputational indicator for the first user based on a subset of information in the reputational profile for the first user,
the subset of information being determined to be applicable to the service;
generate a dynamically changing graphical representation for the first user to be provided to the third device,
the dynamically changing graphical representation for the first user including:
the reputational indicator for the first user,
a verification code,
the particularized embedded pattern assigned to the second user,
the particularized embedded pattern being configured to be displayed based on an interaction with the dynamically changing graphical representation, and
a dynamic visual element that is different from the reputational indicator, the verification code, and the particularized embedded pattern;
provide the dynamically changing graphical representation for the first user to the third device;
receive, from the second device, a verification request that includes the verification code;
determine, using the verification code, whether the dynamically changing graphical representation for the first user is authentic; and
transmit, to the second device and based on determining that the dynamically changing graphical representation for the first user is authentic, a verification response.

2. The first device of claim 1, where the one or more processors are further to:
identify first user information;
identify second user information;
determine that the first user information is more relevant to the service than the second user information; and
assign a higher weight to the first user information than the second user information based on determining that the first user information is more relevant to the service than the second user information; and
where the one or more processors, when generating the reputational indicator for the first user, are to:
generate the reputational indicator based on assigning the higher weight to the first user information.

3. The first device of claim 1, where the one or more processors are further to:
identify first user information;
identify second user information; and
determine that the first user information is more relevant to the service than the second user information; and
where the one or more processors, when generating the reputational indicator for the first user, are to:
generate the reputational indicator based on the first user information and not based on the second user information.

4. The first device of claim 1, where the user information includes at least one of:
a phone number; or an email
address.

5. The first device of claim 1, where the verification request includes the particularized embedded pattern; and
where the one or more processors, when determining whether the dynamically changing graphical representation is authentic, are to:
determine whether the dynamically changing graphical representation for the first user is authentic based on the particularized embedded pattern.

6. The first device of claim 1, where the one or more processors, when generating the reputational indicator, are to:
   generate, based on machine learning, the reputational indicator.

7. The first device of claim 1, where the one or more processors are further to:
   transmit a response code; and
   verify, after receiving the user information, the user information based on the user information including the response code.

8. A non-transitory computer-readable medium storing instructions, the instructions comprising:
   one or more instructions that, when executed by one or more processors of a first device, cause the one or more processors to:
   access multiple types of user accounts associated with a first user;
   receive reputational information, that indicates a reputation of the first user, based on accessing the multiple types of user accounts,
      the multiple types of user accounts, associated with the first user, being associated with at least two different services;
   generate a reputational profile for the first user based on the reputational information;
   assign, based on an installation of a reputation application on a second device associated with a second user, a particularized embedded pattern to the second user to be displayed on graphical representations associated with reputational profiles of a plurality of users including the first user,
      the particularized embedded pattern allowing the graphical representations to be verified;
   receive, from a third device associated with a service and based on an interaction by the second user on the second device, a request to provide a graphical representation associated with the reputational profile for the first user;
   generate a reputational indicator for the first user based on a subset of information in the reputational profile for the first user,
      the subset of information being determined to be applicable to the service;
   generate a dynamically changing graphical representation for the first user to be provided to the third device,
      the dynamically changing graphical representation for the first user including:
         the reputational indicator for the first user,
         a verification code,
         the particularized embedded pattern assigned to the second user,
            the embedded pattern being configured to be displayed based on an interaction with the dynamically changing graphical representation, and
         a dynamic visual element that is different from the reputational indicator, the verification code, and the particularized embedded pattern;
   provide the dynamically changing graphical representation for the first user to the third device
   receive, from the second device, a verification request that includes the verification code;
   determine, using the verification code, whether the dynamically changing graphical representation for the first user is authentic; and
   transmit, to the second device and based on determining that the dynamically changing graphical representation for the first user is authentic, a verification response.

9. The non-transitory computer-readable medium of claim 8, where the one or more instructions, when executed by the one or more processors, further cause the one or more processors to:
   identify first reputational information;
   identify second reputational information; and
   determine that the first reputational information is more relevant to the service than the second reputational information; and
   where the one or more instructions, that cause the one or more processors to generate the dynamically changing graphical representation for the first user, cause the one or more processors to:
   generate the dynamically changing graphical representation for the first user including the first reputational information and not including the second reputational information.

10. The non-transitory computer-readable medium of claim 8, where the one or more instructions, when executed by the one or more processors, further cause the one or more processors to:
    identify a first user account of a first type of the multiple types of user accounts; identify a second user account of a second type of the multiple types of user accounts; and
       determine that the first user account is more relevant to the service than the second user account; and
       where the one or more instructions, that cause the one or more processors to generate the dynamically changing graphical representation for the first user, cause the one or more processors to:
       generate the dynamically changing graphical representation for the first user including information associated with the first user account and not associated with the second user account.

11. The non-transitory computer-readable medium of claim 8, where the dynamically changing graphical representation for the first user includes a link to at least one of the multiple types of user accounts.

12. The non-transitory computer-readable medium of claim 8, where the one or more instructions, when executed by the one or more processors, further cause the one or more processors to:
    provide the reputational profile for the first user to the third device.

13. The non-transitory computer-readable medium of claim 8, where the one or more instructions, when executed by the one or more processors, further cause the one or more processors to:
    transmit a response code; and
    verify, after receiving the reputational information, the reputational information based on the reputational information including the response code.

14. The non-transitory computer-readable medium of claim 8, where the one or more instructions, when executed by the one or more processors, further cause the one or more processors to:
    receive user information associated with the first user including at least one of:
       a criminal record,
       a commercial record,
       a financial record,
       an employment record, an educational record,
a professional record, or
a background check; and
where the one or more instructions, that cause the one or more processors generate the reputational profile for the first user, cause the one or more processors to:
generate the reputational profile for the first user based on the user information.

15. A method, comprising:
accessing, by a first device, multiple types of user accounts of a first user;
receiving, by the first device and based on accessing the multiple types of user accounts of the first user, user information associated with the first user,
the user information including reputation information associated with a reputation of the first user;
generating, by the first device, a reputational profile for the first user based on the user information;
assigning, by the first device and based on an installation of a reputation application on a second device associated with a second user, a particularized embedded pattern to the second user to be displayed on graphical representations associated with reputational profiles of a plurality of users including the first user,
the particularized embedded pattern allowing the graphical representations to be verified;
receiving, by the first device, from a third device associated with a service,
and based on an interaction by the second user on the second device, a request to provide a graphical representation associated with the reputational profile and for the first user; generating, by the
first device, a reputational indicator for the first user based on a subset
of information in the reputational profile,
the subset of information being determined to be applicable to the service; generating, by the first device, a dynamically changing graphical representation for the first user to be provided to the third device,
the dynamically changing graphical representation for the first user including:
the reputational indicator for the first user,
a verification code,
the particularized embedded pattern assigned to the second user,
the particularized embedded pattern being configured to be displayed based on an interaction with the dynamically changing graphical representation, and
a dynamic visual element that is different from the reputational indicator,
the verification code, and the particularized embedded pattern;
providing, by the first device, the dynamically changing graphical representation for the first user to the third device;
receiving, by the first device and from the second device, a verification request that includes the verification code;
determining, by the first device and using the verification code, whether the dynamically changing graphical representation for the first user is authentic; and
transmitting, by the first device, to the second device, and based on determining that the dynamically changing graphical representation for the first user is authentic, a verification response.

16. The method of claim 15, further comprising:
identifying first user information;
identifying second user information;
determining that the first user information is more relevant to the service than the second user information; and
assigning a higher weight to the first user information than the second user information based on determining that the first user information is more relevant to the service than the second user information; and
where generating the reputational indicator for the first user comprises:
generating the reputational indicator for the first user based on assigning the higher weight to the first user information.

17. The method of claim 15, where the user information includes information from a first user account associated with the service that is different from a second user account associated with another service,
the first user account and the second user account being associated with the first user.

18. The method of claim 15, further comprising:
identifying first user information;
identifying second user information; and
determining that the first user information is more relevant to the service than the second user information; and
where generating the reputational indicator for the first user comprises:
generating the reputational indicator for the first user based on the first user information and not based on the second user information.

19. The method of claim 15, further comprising:
identifying a quantity of user information associated with the reputation profile for the first user; and
where generating the reputational indicator for the first user comprises:
generating the reputational indicator for the first user based on the quantity of user information.

20. The method of claim 15, further comprising:
transmitting a response code; and
where the method further comprises:
verifying, after receiving the user information, the user information based on the user information including the response code.

* * * * *